(12) United States Patent
Schumacher et al.

(10) Patent No.: US 7,861,427 B2
(45) Date of Patent: Jan. 4, 2011

(54) GRADE INDICATING DEVICE AND METHOD

(75) Inventors: Lars Schumacher, Relsberg (DE); Karsten Woll, Otterberg (DE); Otto Bellon, Kaiserslautern (DE)

(73) Assignee: Trimble Kaiserslautern GmbH, Kaiserslautern (DE)

( * ) Notice: Subject to any disclaimer, the term of this patent is extended or adjusted under 35 U.S.C. 154(b) by 34 days.

(21) Appl. No.: 12/447,765

(22) PCT Filed: Nov. 3, 2006

(86) PCT No.: PCT/EP2006/010573
§ 371 (c)(1),
(2), (4) Date: Apr. 29, 2009

(87) PCT Pub. No.: WO2008/052590
PCT Pub. Date: May 8, 2008

(65) Prior Publication Data
US 2010/0064534 A1    Mar. 18, 2010

(51) Int. Cl.
*G01C 5/02* (2006.01)
(52) U.S. Cl. .............................. 33/291; 33/282; 33/521
(58) Field of Classification Search .................. 33/281, 33/282, 283, 285, 290, 291, 521
See application file for complete search history.

(56) References Cited

U.S. PATENT DOCUMENTS

| | | | | |
|---|---|---|---|---|
| 5,485,266 A * | 1/1996 | Hirano et al. | ................. | 33/281 |
| 5,636,018 A * | 6/1997 | Hirano et al. | ................. | 33/291 |
| 5,655,307 A | 8/1997 | Ogawa et al. | | |
| 5,742,387 A * | 4/1998 | Ammann | ...................... | 33/290 |
| 5,790,248 A * | 8/1998 | Ammann | ...................... | 33/283 |
| 5,852,493 A * | 12/1998 | Monnin | ....................... | 33/291 |
| 6,906,310 B1 * | 6/2005 | Jiang et al. | .................... | 33/227 |
| 7,395,604 B2 * | 7/2008 | Chien et al. | ................... | 33/290 |
| 2003/0128353 A1 | 7/2003 | Greco | | |
| 2003/0145474 A1* | 8/2003 | Tacklind et al. | ............... | 33/290 |
| 2006/0242850 A1* | 11/2006 | Ammann et al. | .............. | 33/290 |
| 2009/0119050 A1* | 5/2009 | Hayashi | ....................... | 702/94 |

OTHER PUBLICATIONS

German Application No. 11 2006 004 097.9-52 Office Action dated Jan. 26, 2010.

* cited by examiner

*Primary Examiner*—G. Bradley Bennett
(74) *Attorney, Agent, or Firm*—Dinsmore & Shohl LLP

(57) ABSTRACT

The application relates to indicating a grade for example in constructions applications using a laser beam. A laser beam is emitted from a laser unit to a desired direction having a grade angle with regard to a level angle. The level sensor is provided for adjusting the level angle and a grade sensor is provided for indicating a grade angle on the basis of the level angle from the level sensor.

29 Claims, 10 Drawing Sheets

MEMORY

Grade output value at level angle X-Axis   2,511111
Grade output value at level angle Y-Axis   2,5

Grade output value at level angle X-Axis   1,511111
Grade output value at level angle Y-Axis   1,5

GRADE INDICATING DEVICE AND METHOD

FIELD OF THE INVENTION

The present invention relates to indicating a grade using a laser beam.

BACKGROUND

Laser beam systems for indicating grades are employed in various surveying and construction applications. The laser beam emitted by the grade indicating device can be used as an elevational reference over a work area such as for example a construction site.

If the laser beam emitter of the grade indicating device is arranged to rotate the laser beam in a plane, the rotating laser beam can be used to establish a reference plane as an elevational reference over a two-dimensional work area. Laser beam detectors placed remote from the grade indicating device intercept the laser beam for guidance. The laser beam detectors may for example be mounted on tools or machinery and guide an operator on a construction site or to shape a terrain. For example the laser beam detectors are carried by earth moving equipment to determine proper elevation at various points throughout the work area.

If the laser beam or the reference plane is tilted by a known grade angle or angles for example to a horizontal direction or level plane, the grade indicating device can be used to indicate by way of the laser and thus shape various kinds of slopes, or to match or shape existing landscapes.

It is conceivable that for exact grade indication over long distances it is required to finely adjust the laser beam with regard to a reference direction or reference plane. Usually, if a grade is to be indicated on the basis of a level plane or a horizontal direction of the laser beam, the grade indicating device may be adjusted based on an initial position with the laser beam exactly horizontal or the reference plane in a rotating laser beam application being exactly level. Starting therefrom the grade angle is adjusted to the desired value such as by using stepper motors and a known relation between individual steps of the motor and grade angles. Alternatively the grade angle of the laser may be directly indicated by making use of a sensor affixed to the laser emitter, the sensor measuring an inclination of the laser emitter.

While this approach works well in simpler or small scale applications, many applications require an accuracy that cannot be achieved by the above procedure. For example, the grade indicating device may not be placed in a proper initial position for a level reference plane, temperature variations over time may change once adjusted angles, or the accuracy of the sensor may not be sufficient. These influences lead to potentially large errors of the indicated grade, particularly in larger distances.

SUMMARY OF THE INVENTION

It is therefore desirable to provide a grade indicating device with highly accurate grade angle adjustment of a laser beam adjustment and with improved handling for increased productivity.

According to an embodiment of the invention a grade indicating device comprises a laser unit to emit a laser beam, a grade sensor affixed to the laser unit to provide a grade output value corresponding to a grade angle of the laser beam relative to a laser angle, a level sensor affixed to the laser unit to indicate the level angle of the laser beam, and a mechanical unit to adjust the grade angle of the leaser beam so that the grade sensor provides a desired grade output value. By employing a combination of a level sensor and a grade sensor improved accuracy can be achieved.

According to an example a controller is provided to issue a command instructing the mechanical unit to adjust a grade angle of the laser unit so that the laser sensor provides a predetermined level output value corresponding to the level angle of the laser beam, to obtain the grade output value of the grade sensor at the level angle, and to obtain the desired grade output value of the grade sensor based on a desired grade angle of the laser unit and the grade output value of the grade sensor at the level angle.

According to another example at least a portion of the laser unit is rotatable to emit the laser beam in a laser plane, the grade output value consisting of two output value elements and wherein each of the output value elements corresponds to one grade angle element is associated with one of an x-axis and a y-axis substantially perpendicular to one another and defining the laser plane, and wherein the grade indicating device includes a visual indication aligned with at least one of the axes. Accordingly, the grade indicating device may not only indicate a grade angle using a laser beam, but be adapted to rotate the laser beam in a laser plane in order to indicate a reference plane tilted into desired directions along the x-axis and the y-axis.

According to another example the controller is adapted to obtain the desired grade output value by accessing a memory holding a table of a plurality of grade output values of the grade level sensor and corresponding grade angles of the laser beam. With the prepared table the amount of computations during operation can be reduced.

According to another example the controller is adapted to obtain the desired grade output value based on a correlation function describing a functional relation between grade output value differences of the grade level sensor and the grade angle differences of the laser beam.

According to another example the controller is adapted to obtain in the desired grade output value of the grade sensor by an interpolation between two grade output values held in the table that correspond to two grade angles held in the table that are closest to the desired grade angle. Thus, the table does not necessarily store all possible grade angles and corresponding grade sensor output values, but an interpolation may be used to estimate grade angles not available in the table.

According to another example a temperature sensor is provided to detect an ambient temperature of the grade indicating device and emit an instruction commanding a readjustment of the zero angle, if a temperature change exceeds a predetermined threshold. Accordingly, in order to avoid excessive variations of the grade angles and thus of the laser beam or laser plane due to temperature variations, the grade indicating device is readjusted.

According to another example a position sensor is provided to detect a position of the grade indicating device and to emit an alarm, if a positional change exceeds a predetermined threshold.

According to another example a level sensor output value under the condition that the laser plane is level is defined as the level output value defining the zero angle.

According to another example for readjusting the zero angle during operation the controller is adapted to emit an instruction to the mechanical unit to adjust a grade angle of the laser unit so that the level sensor provides the level output value defining the zero angle and thereafter to emit an instruction commanding the mechanical unit to adjust a grade angle of the laser unit again into the position in which the grade sensor provides the desired grade output value.

According to another example the controller is adapted to record in a memory holding the table a plurality of grade output values corresponding to externally said known grade angles, such as for an initial recording of the table for later reference during operation.

According to another example the controller is adapted to record in a memory holding the table a plurality of grade output values corresponding to externally said known grade angle elements corresponding to the x-axis and corresponding to the y-axis.

According to another example the grade sensor includes a gravity sensor.

Still further, according to another example the level sensor includes a detector of a position of a bubble in a fluid.

According to another embodiment of the invention a method for indicating a grade comprises emitting a laser beam from a laser unit, providing a grade output value by a grade sensor fixed to the laser unit, the grade output value corresponding to a grade angle of the laser beam relative to a level angle, indicating the level angle of the laser beam by a level sensor affixed to the laser unit, and adjusting the grade angle of the laser beam by a mechanical unit so that the grade sensor provides a desired output value.

According to another embodiment a program is provided including instructions adapted to cause data processing means to carry out the method operations.

According to another embodiment a computer readable medium is provided in which the program is embodied.

A computer program product may comprise the computer readable medium.

According to another embodiment an optical instrument is provided comprising the grade indicating device.

Further advantageous embodiments of the invention are disclosed in further claims.

DETAILED DESCRIPTION OF THE EMBODIMENTS

In the following embodiments are described by making reference to FIGS. 1 and 10.

Figure 1:
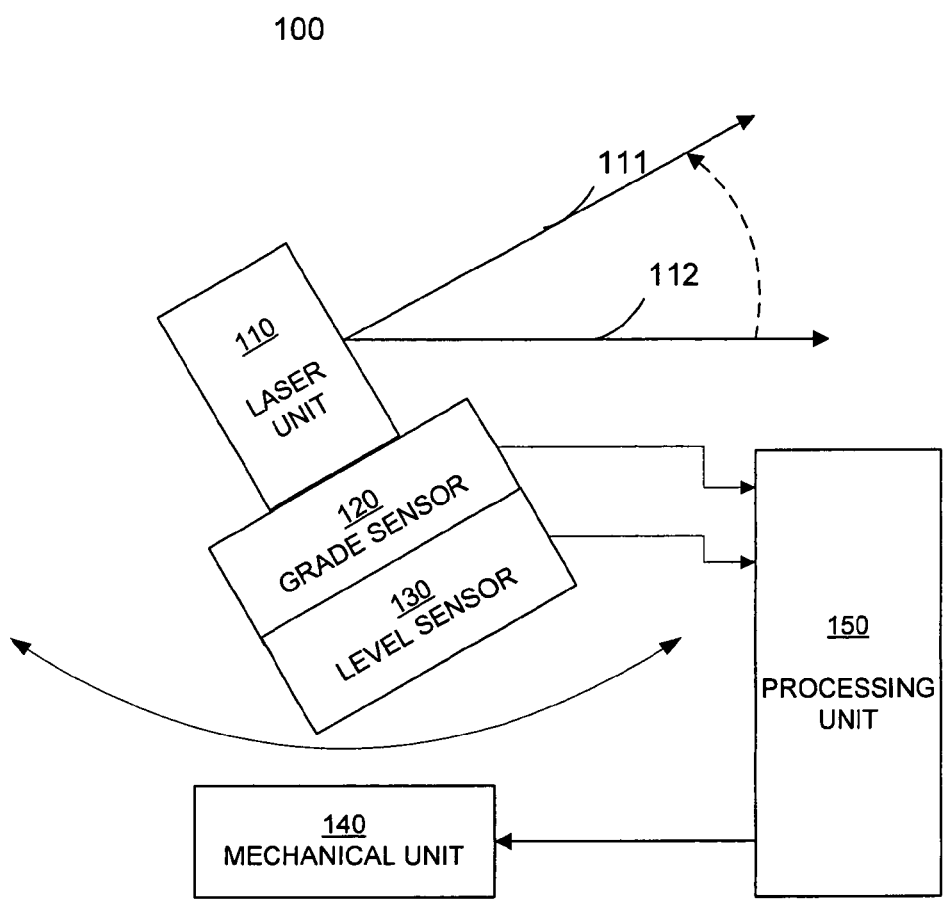
FIG. 1 illustrates elements of a grade indicating device according to an embodiment of the invention.

FIG. 1 illustrates elements of a grade indicating device according to an embodiment of the invention.

The grade indicating device in the embodiments uses a laser beam emitted with a desired grade angle with regard to a level angle or reference direction. The embodiment makes use of a combination of a grade sensor and a level sensor for determining a level angle and a grade angle with respect to or relative to the level angle. In an example, by employing a combination of a level sensor and a grade sensor improved accuracy can be achieved by using the level sensor to indicate the level angle of the laser beam and the grade sensor to indicate the grade angle of the laser beam once the level angle has been adjusted. The mechanical unit can then be used to adjust grade angles so that a desired grade output value corresponding to a grade angle is obtained, thus relying for adjusting the grade angle on the output of the grade sensor. Thus, in order to adjust the level angle the level sensor is employed to provide a predetermined level output value, making use of e.g. a high accuracy level indication of the level sensor. The grade output value at the level angle obtained, grade angles can be adjusted with high accuracy employing e.g. a highly accurate relative angle indication of the grade sensor.

More precisely, FIG. 1 illustrates a grade indicating device generally denoted 100, comprising a laser unit 110 to emit a laser beam 111. A grade sensor 120 is affixed to the laser unit to provide a grade output value corresponding to a grade angle of the laser beam relative to a level angle, and a level sensor 130 is affixed to the laser unit to indicate the level angle of the laser beam.

A mechanical unit 140 is provided to adjust a grade angle of the laser beam so that the grade sensor provides a desired grade output value. A processing unit 150 may be provided to obtain the output values of the grade sensor and the level sensor and to issue an appropriate instruction to the mechanical unit 140.

In the shown embodiment both the grade sensor 120 and the level sensor 130 are affixed to the laser unit 110 in order to ensure that the output values of the grade sensor and the level sensor are in fixed relation to the laser beam 111 emitted from the laser unit 110.

According to the present embodiment the combination of the grade sensor 120 and the level sensor 130 is used to adjust a level angle for the laser unit with high accuracy and to calculate grade angles on the basis of the level angle provided by the level sensor by making use of the grade sensor 120. For example, level sensors are available that with high accuracy provide a level signal corresponding to a fully level direction or horizontal direction of the laser unit and the laser beam and thus can advantageously be used as the level sensor 130.

Moreover, grade sensors are available that with high accuracy provide output value changes corresponding to grade angle changes and thus are suitable to adjust a grade angle based on known relative variations of the grade level sensor output value with regard to a variation of the grade angle. As grade sensors may not provide an accurate level angle corresponding for example to a fully horizontal level position of the laser beam or laser plane, the level angle is provided by the level sensor 130 and relative angles with regard to the level angle provided by the level sensor are then adjusted on the bases of the output value from the grade sensor.

Briefly said, level sensors 130 are available that provide a high accuracy level angle, whereas grade sensors 120 are available that provide a high relative accuracy, albeit a low absolute accuracy. Combining a level sensor with a high accuracy level angle indication and a grade sensor with a high accuracy relative grade angle indication with regard to the level angle determined from the output of the level sensor an improved grade indicating device with improved accuracy can be provided.

If for example it is known that the grade sensor provides a known change in an output value, e.g. voltage, corresponding to a known change of the grade angle, i.e. if a functional relationship or correspondence between the change of output values of the grade sensor and the change of the grade angle is known, an accurate adjustment of the grade angle becomes possible by making use of an indication of the level angle from the level sensor. For example, an output value of the grade sensor in a position in which the level sensor provides a predefined output indicating the level angle is obtained as a reference value and then the grade indicating device is adjusted such that the grade sensor provides an output value exhibiting a certain desired difference to the grade sensor output value at the level angle, corresponding to a grade angle of the laser beam with respect to the level angle.

This procedure works particularly well if the output value of the grade sensor varies linearly with the grade angle, however, any other functional relation could be present, in which case a desired grade angle can be transformed into a desired grade sensor output value using the functional relation.

In the following examples of the constituent elements of the grade indicating device 100, shown in FIG. 1 are described. It is noted that the following constitutes examples only and should not be construed as limiting the invention.

According to an example the grade indicating device 100 comprises a housing, not shown in FIG. 1, holding the constituent elements of the device, i.e., the laser unit 110, the grade sensor 120, the level sensor 130, the mechanical unit 140 and the processing unit 150 and possibly further units such as an indicating device for indicating or user setting a desired grade angle of the laser beam, such as a display and adjusting buttons for setting a desired grade angle.

In order to be able to adjust the grade angle of the laser beam 111, the laser unit 110 and the affixed grade sensor 120 and level sensor 130, at least, should be mounted pivotable, the tilting angle corresponding to the desired grade angle and controlled by the mechanical unit 140. For example, the laser unit and the sensors 120 and 130 could be pivotably mounted in an upper portion of the housing, and a mechanical arrangement, not shown in FIG. 1, driven by the mechanical unit 140 is present to tilt or rotate the laser unit and sensors around the pivoting point. For example, the laser unit and thus the laser beam may be pivotable with regard to the level angle by +/−10 degrees or any other range, depending on the properties of the mechanical unit 140.

In order to allow the laser beam 111 to exit the housing, an upper transparent light house assembly, not shown in FIG. 1, may be integrated into the housing, through which the laser beam is projected. For example, the light house assembly of the housing may include four upstanding flat transparent panes of glass of high optical quality that are joined together at their side edge surfaces so as to form a square in cross section. The lower edges of the panes may be mounted within a recess formed in an upper rim of the housing, while the upper edges of the panes are mounted within recessed seats formed within a top casing of the housing. This would allow the laser beam to be emitted in any direction. Alternatively, if the laser beam is to be emitted only in one direction, a single glass pane may suffice.

The laser unit 110 may be any kind of laser unit used in the field of surveying equipment, such as a laser unit that emits a laser beam in a vertical direction onto a prism or mirror arrangement deflecting the laser beam into horizontal direction, to achieve small scale properties of the grade indicating device. The laser unit 110 in one example comprises a housing with at least one mounting member for being rotatably mounted in the housing of the grade indicating device 100.

The level sensor 130 is fixed to the laser unit preferably such that even over time deviations between the relative position of the laser unit with regard to the level sensor do not occur. Similarly, the grade sensor 120 is fixed to the laser unit, preferably stable at least over the time to the next readjusting of the level angle.

The level sensor 130 may be any level sensor as known in the art, for example, the laser sensor 130 is constituted by a sensor detecting a position of a bubble in a fluid, e.g. using infrared light emitters and sensors, photodiodes, for detecting a bubble in a glass vial. However, it is noted that any other sensor may be employed as level sensor, provided that the sensor is able to provide accurately an output signal corresponding to a level angle. If for example the direction indicated 112 and FIG. 1 is considered to constitute a horizontal direction, it is preferable that the level sensor is arranged such that it provides invariably and repeatably an output signal corresponding to the level angle or horizontal direction. For example, the level sensor could be arranged such that at the level angle the level sensor provides a maximum output signal or any other pre-stored defined output signal.

The grade sensor 130 may be constituted by a gravity sensor for detecting a position of the grade sensor based on gravitational forces. However, it is explicitly noted that any other sensor may be provided or used as grade sensor 120, given a suitably high accuracy for adjusting a grade angle with respect to a level angle. The grade sensor in one example provides an output value changing according to a known function in correspondence to a grade angle so that the grade sensor, for adjusting a desired grade angle, can be adjusted such that the grade sensor provides a known desired output value, i.e., the laser unit can be rotated until the grade sensor provides the desired output value corresponding to the desired grade angle.

The mechanical unit 140 in one example is fixed to the housing of the grade indicating device 100 and comprises a mechanical arrangement, not shown in FIG. 1, for tilting the laser unit and grade and level sensors around the pivoting point. For example, the mechanical unit includes a stepper motor for turning the laser unit, with the individual steps of the stepper motor corresponding to grade angle increments, such that by counting the steps of the stepper motor a grade angle can be adjusted based on the corresponding output values of the grade sensor. The stepper motor may rotate a spindle for effecting a movement or rotation of the laser unit around the pivoting point. While the mechanical unit in one example is attached to the housing of the grade indicating device 100 and rotates the laser unit, the mechanical unit in another example is mounted at the laser unit.

The processing unit 150 may be any kind of central processing unit or microcontroller of the grade indicating device, to issue instructions to the mechanical unit 140 based on output values of the grade sensor and the level sensor. For example, the processing unit 150 reads a grade output value corresponding to a grade angle of the laser beam relative to a level angle from the grade sensor and instructs the mechanical unit to adjust the grade angle of the laser beam so that the grade sensor provides a desired output value. Moreover, the processing unit in an example instructs the mechanical unit to adjust the grade angle of the laser beam such that the level sensor indicates the level angle of the laser beam as a reference point for operating the mechanical unit based on the output value from the grade sensor for adjusting a desired grade angle.

While the processing unit 150 may be provided as a separate entity connected to the grade sensor and level sensor and the mechanical unit, in an alternative embodiment it is also possible that the grade sensor, the level sensor and the mechanical unit integrate control elements that provide the functionality of the processing unit 150.

The processing unit may be operated on the basis of programs stored in a memory, not shown, which when loaded into the processing unit make the processing unit execute the above functionality. Alternatively or in addition thereto elements of the processing unit and associated programs may also be partially or fully implemented directly in hardware, such as using application specific integrated circuits.

In the following a further embodiment of the invention will be described with regard to FIG. 2.

Figure 2:
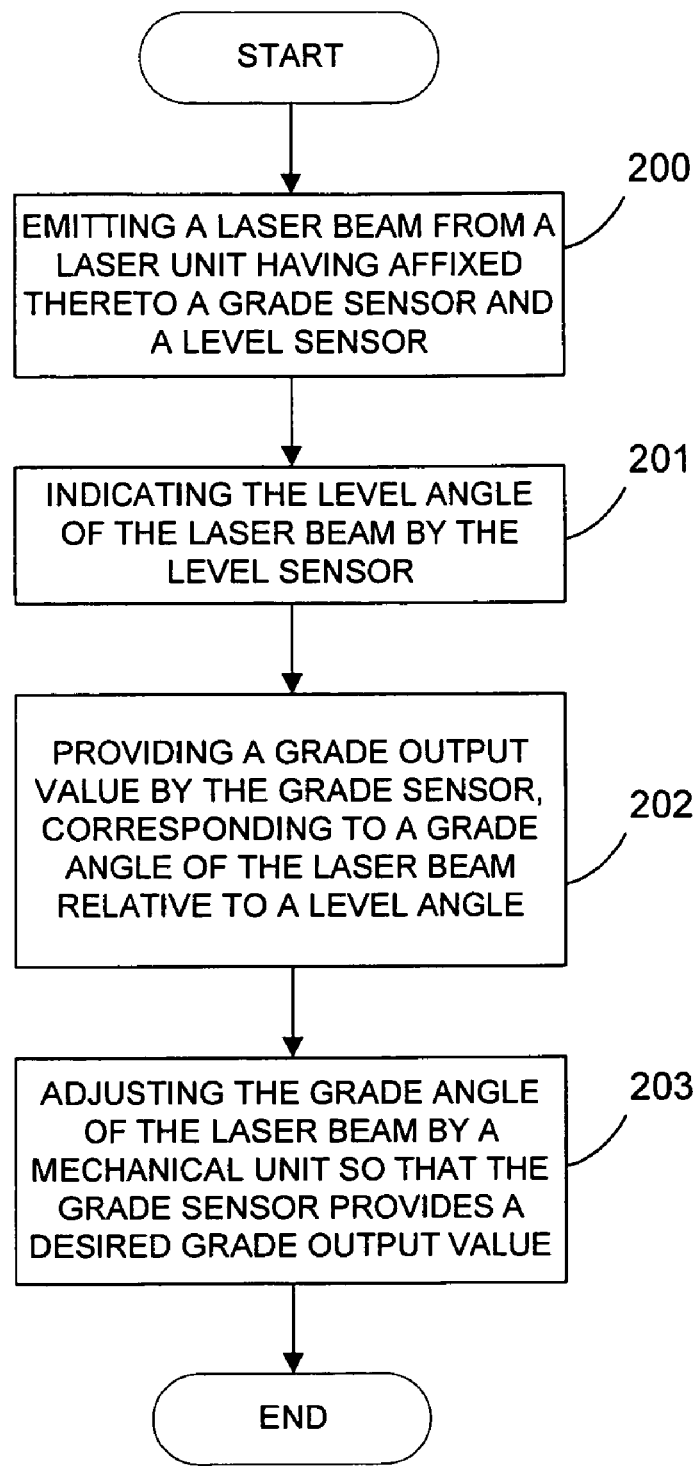
FIG. 2 illustrates operations of a method for indicating a grade according to an embodiment of the invention.

FIG. 2 illustrates operations of a method for indicating a grade according to an embodiment of the invention, for example using the grade indicating device shown in FIG. 1, however, FIG. 2 is not limited thereto. FIG. 2 illustrates operations during regular operation of the grade indicating device in order to direct the laser beam into a direction having a known grade angle with regard to a level angle.

In a first operation 200 a laser beam is emitted from a laser unit, such as laser unit 110, having affixed thereto a grade sensor, such as grade sensor 120 of FIG. 1, and a level sensor, such as the level sensor 130 of FIG. 1. The laser beam may be emitted into a single direction or the laser unit may rotate to emit the laser beam in a laser plane.

In an operation 201 the level angle of the laser beam is indicated by the level sensor. Thus, the level sensor, preferably with a high accuracy level indication, provides or defines the level angle as a reference for the grade sensor and the obtaining of the desired grade output value.

In an operation 202 the grade sensor provides a grade output value that corresponds to a grade angle of the laser beam relative to the level angle of the laser beam indicated by the level sensor. In other words, the grade sensor provides a grade output value that deviates from an output value of the grade sensor at a level angle by a difference corresponding to a grade angle of the laser beam relative to a level angle, e.g., on the basis of the functional relation noted previously.

In an operation 203 the grade angle of the laser beam is adjusted by a mechanical unit, for example the mechanical unit 140, such that the grade sensor provides a desired grade output value corresponding to a desired grade angle. The adjusting step can be performed by varying the grade angle of the laser beam and observing the output of the grade sensor during the variation until the desired grade output value is detected.

FIG. 2 illustrates operations that are performed for indicating a level angle by making use of the level sensor and by adjusting a grade angle using the grade sensor on the basis of the level angle provided by the level sensor, allowing adjustment of the grade angle of the laser beam with high accuracy. As the grade angle can simply be adjusted by adjusting the orientation of the laser beam until a desired grade sensor output value is provided, simple grade indication becomes possible and a high overall productivity is achieved.

In the following a further embodiment of the invention will be described with regard to FIG. 3.

Figure 3:
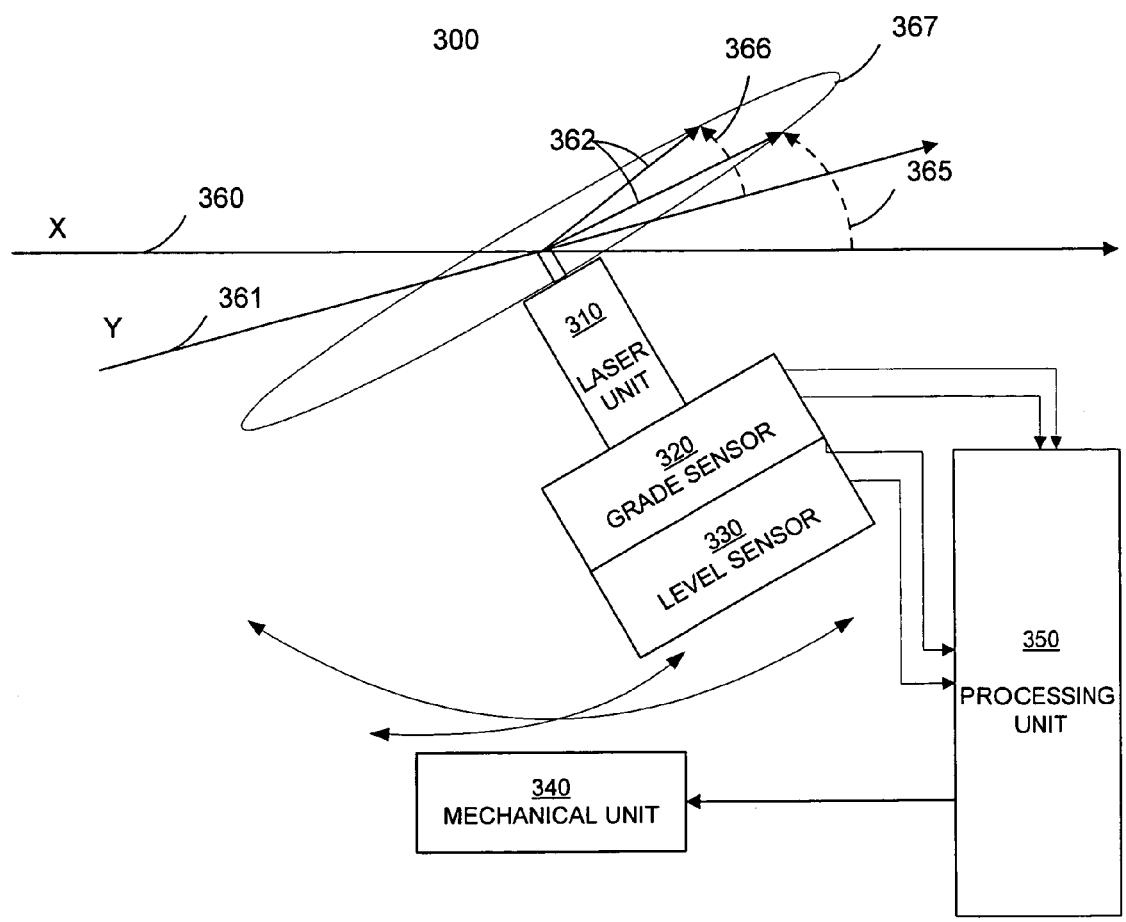
FIG. 3 illustrates elements of a grade indicating device according to an embodiment of the invention, particularly illustrating a grade indicating device emitting a rotating laser beam in a reference plane.

FIG. 3 illustrates elements of a grade indicating device according to another embodiment of the invention, particularly illustrating a grade indicating device providing a reference plane by rotating the laser beam. While FIG. 1 illustrates a grade indicating device for example allowing a one-dimensional adjustment of a grade angle with regard to a level angle such as a horizontal direction, FIG. 3 enables a dual grade adjustment by individually setting two grade angle elements to define a tilting or grade of the laser plane in two directions.

FIG. 3 generally illustrates a grade indicating device 300, including a laser unit 310 wherein at least a portion of the laser unit is rotatable to emit the laser beam in a laser plane 367. The laser unit 310 in one example produces the laser beam rotating in the plane by projecting the laser beam generally upward and then redirecting it 90 degrees within a mirror or pentaprism assembly. The pentaprism assembly in one example includes a pair of mirrors to produce a double reflection and is rotated about a vertical axis, given that the grade indicating device is in upright position, within the projecting apparatus to cause a horizontal beam to rotate, defining the laser plane. The laser plane may be tilted by a specified grade angle with respect to horizontal or level direction, thereby providing a tilted laser plane, as shown in FIG. 3. For example, the laser plane is tilted with regard to a reference plane defined by an x-axis and a y-axis preferably perpendicular to one another. In one example the x- and y-axis span a reference plane that is level, i.e. horizontal. It is noted, that, however, any other level angle of the reference plane may be defined, such as for example with one of the x- and y-axis being in vertical direction.

The reference plane 367, similar to the reference direction 112 of FIG. 1 is defined by the laser beam at level angle, i.e., when the level sensor provides the output signal corresponding to the level angle.

With one degree of freedom added by providing a laser plane through the rotating laser beam, the grade angle comprises two grade angle elements associated with one of the x-axis and the y-axis. In an example the laser plane is tilted in x-direction as indicated by the arrow 265 and is tilted in the y-direction as indicated by the arrow 366. Likewise the level sensor provides a level angle having two level angle elements.

Correspondingly the grade sensor 320 provides a grade output value consisting of two grade output value elements and the level sensor 330 provides a level sensor output value having two level output value elements.

A grade sensor or level sensor providing respectively two output value elements may be obtained by arranging two grade sensor or level sensor elements perpendicularly with regard to one another, preferably aligned with the x- and y-axis.

Each grade output value element corresponds to one grade angle element associated with one of the x-axis and the y-axis defining the laser plane. While the x-axis and y-axis may be arranged perpendicularly with regard to one another, any other orientation of the x- and y-axis is possible.

The level sensor in the present embodiment has two sensing directions for indicating level output values corresponding to two level angle elements. Likewise, the grade sensor in the present embodiment has two sensing directions for indicating grade output values corresponding to two grade angle elements. The sensing direction of the grade sensor preferably is aligned with the x- and y-axis so that any setting of grade angle elements by an operator corresponds to a tilting of the laser plane relative to the x- and relative to the y-axis. Preferably the grade indicating device includes a visual indication aligned with at least one of the x- and y-axis in order to provide a visual reference for an operator to align the orientation of the grade indicating device, the x- and y-axis, with a landscape or object so that an association between desired grade angle elements and a direction on a construction site etc. is established. For example the visual indication is used by an operator of the grade indicating device to align the x- or y-axis with a property of the landscape or of an object, in order to provide an association with a grade angle element of the axis and the "real world".

While the grade indicating device may comprise one such indication for one of the axis, it is also possible that the grade indicating device provides for two such visual indications for both of the x- and y-axis, providing a visual indication of the direction in which the grade angle elements will be adjusted.

The mechanical unit 340, in order to be able to adjust the laser plane based on two grade angle elements, comprises a mechanical arrangement to rotate the laser unit in two directions, preferably perpendicular to one another and aligned with the x- and y-axis. For example, the mechanical unit 340, in addition to the stepper motor and spindle of FIG. 1 may include a second stepper motor and second spindle to effect rotation of the laser unit in order to account for the two grade angle elements. However, it is noted that the mechanical arrangement to rotate the laser unit in the two directions should be in correlation to the visual indication on the housing such as on a sunshade of the grade indicating device, i.e. the x- and y-axis, but not necessarily is aligned with the sensing directions of the grade sensor. I.e. the grade sensor may be placed on a circuit board with some tolerance, whereby, however, a 90 degree angle between the two sensing directions should be assured. A deviation in this respect does not influence the accuracy of the grade indications and the production process can thus be simplified.

The processing unit 350 receives the grade sensor value elements and the level sensor value elements and provides corresponding instructions to the mechanical unit in order to adjust rotating laser beam and the laser plane and the grade angle.

As shown in FIG. 3 the laser plane 367 is tilted in x-direction as indicated by the arrow 365 and is tilted in y-direction as indicated by the arrow 366. Here, reference numeral 362 denotes the laser beam being emitted in rotating fashion to define the laser plane. If the x- and y-axis 360 and 361 are arranged perpendicular to one another, a tilt in x-direction as indicated by the arrow 365 will amount to a rotation around the y-axis, whereas a tilt in y-direction as indicated by the arrow 366 will amount to a rotation around the x-axis. This, however, will not be the case if the x- and y-axis are not perpendicular to one another.

Operation of the embodiment of FIG. 3 is similar to the one of FIG. 1, with the laser beam rotated in a laser plane, the grade angle consisting of two grade angle elements, and the grade output value consisting of two grade output value elements and the level output value also consisting of two level output value elements.

During operation the laser beam is emitted from the laser unit to define the laser plane, the laser unit having affixed thereto the grade sensor and the level sensor. The level sensor indicates the level angle of the laser beam or plane via the two level sensor output values, and the grade sensor provides grade output value elements in x- and y-direction corresponding to the grade angle elements of the laser plane relative to the level angle elements.

The grade angle elements of the laser plane are then adjusted by the mechanical unit so that the grade sensor provides the desired grade output value elements.

In the following, for simplicity reasons some of the further elaboration is made on the basis of the assumption that the laser beam has one degree of freedom, i.e. one grade angle element, however, it is noted that all of the following is equally applicable to a rotating laser beam having grade angle elements corresponding to an x- and y-axis.

In the following a further embodiment of the invention will be described with regard to FIG. 4.

Figure 4:
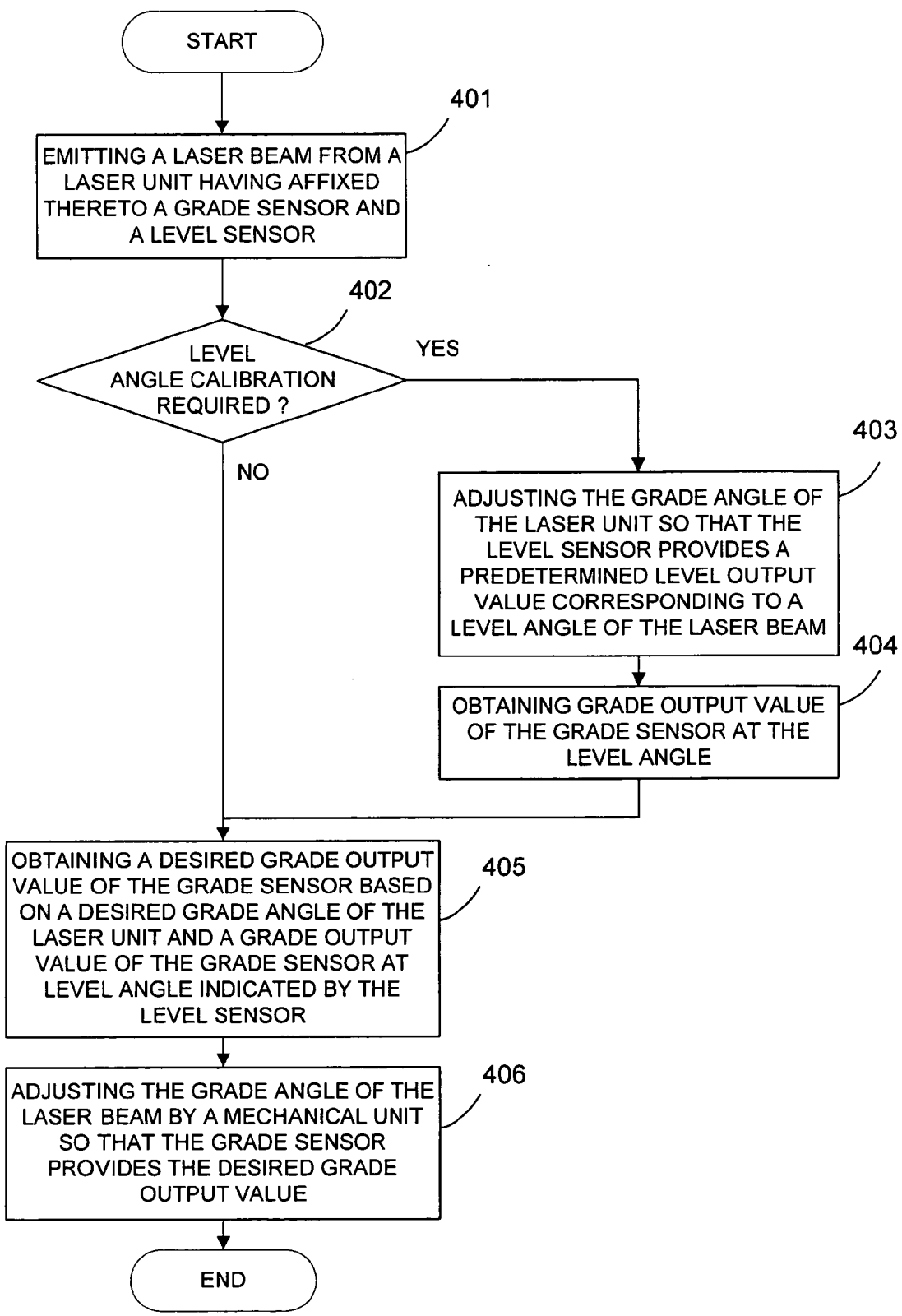
FIG. 4 illustrates operations of a method for indicating a grade according to another embodiment of the invention, particularly illustrating operations for indicating a grade during regular operation.

FIG. 4 illustrates operations of a method for indicating a grade, particularly focussing on the regular operation of the level indicating device, such as the level indicating device of FIG. 1 or of FIG. 3. During operation may be required, due to the potentially lacking accuracy of a level angle indication from the grade sensor, to adjust the level angle by making use of the level sensor. In this process an output value of the grade sensor exactly at the level angle defined by the level sensor is obtained and used for grade indication. Thus, the preferably highly accurate level angle indication from the level sensor can be employed in the process of accurately indicating a grade angle using the grade sensor.

In a first operation 401 a laser beam is emitted from a laser unit having affixed thereto a grade sensor and a level sensor, such as the laser unit 110 or 310 shown in FIGS. 1 and 3, respectively.

In operation 402 it is determined whether a level angle readjustment is required. For example, a level angle readjustment is required upon turning on the grade indicating device or on the basis of meeting further conditions, such as detecting a movement of the device, a change of temperature or other ambient conditions. Moreover, a level angle readjustment could be required based on a user input indicating the whish to adjust the zero angle or level angle of the device.

If in operation 402 the decision is "YES", indicating that a level angle readjustment is required, in an operation 403 the grade angle or grade angle elements of the laser unit are adjusted so that the level sensor provides a predetermined level output or predetermined level output value elements corresponding to a level angle or the level angle elements of the laser beam.

The predetermined level output value corresponding to the level angle may be determined beforehand, for example upon manufacture of the device. For example, during manufacture the grade indicating device with the laser unit may be oriented in such that the laser beam is in a fully level or horizontal direction and the level sensor output values in this truly horizontal/level direction at level angle can be recorded and defined as predetermined level output value.

Accordingly, upon adjusting the laser unit such that the level sensor provides the predetermined level output value, it is known that the laser unit is in a position so that the laser beam or laser plane is on level angle. The level angle may correspond to a horizontal direction, level orientation of the plane. In an alternative, however, the level angle may also be defined to correspond to any other angle, including vertical orientation of the laser plane or laser beam.

In an operation 404, after adjusting the grade angle of the laser unit so that the level sensor provides the predetermined level output value, the grade output value or grade output value elements of the grade sensor at the level angle is obtained. In other words, with the laser beam in a level angle orientation, the "zero position" of the grade sensor is known and the corresponding grade output value can be obtained and/or recorded. It is then known that any grade angle and corresponding grade output value difference to the grade output value at the level angle can be adjusted on the basis of this initial setting or adjustment.

Thereafter, in operation 405 a desired grade output value of the grade sensor is obtained based on a desired grade angle of the laser unit and a grade output value of the grade sensor at the level angle indicated by the level sensor. In other words, with the output of the grade sensor known at the level angle and the known relation between grade angles relative to level angle and the change of the output value of the grade sensor any desired grade output value corresponding to a desired grade angle can be adjusted.

The desired grade output value in operation 405 may be obtained from a pre-recorded table or any computation using a functional relation between the grade angle and the grade output value.

If in operation 402 the decision was "NO", the flow directly proceeds to operation 405.

After obtaining the grade output value corresponding to the desired grade angle, the grade angle of the laser beam is adjusted by the mechanical unit in operation 406 so that the grade sensor provides the desired grade output value. For example, the grade angle may be increased in steps, until the desired grade output value is achieved. Similarly, in the dual grade case the grade angle elements of the laser beam may be adjusted by the mechanical unit so that the grade sensor provides the desired grade output value elements.

In the following a further embodiment of the invention will be described with regard to FIG. 5.

Figure 5:
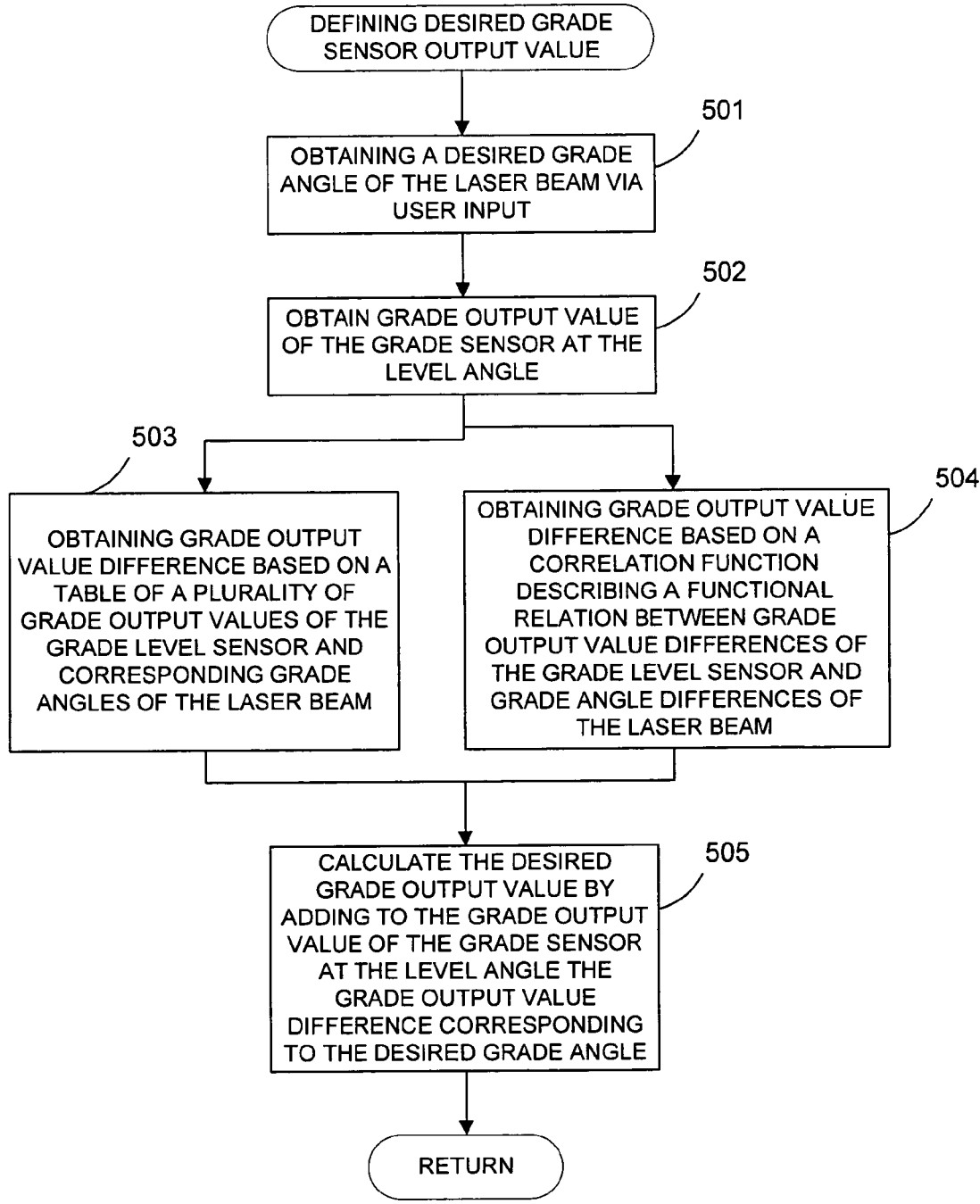
FIG. 5 illustrates operations for indicating a grade according to another embodiment of the invention, particularly illustrating examples to obtain a grade output value difference for adjusting the grade level sensor.

FIG. 5 illustrates operations of a method for indicating a grade, particularly illustrating operations for defining or obtaining a desired grade sensor output value corresponding to a desired grade angle.

It was noted above that the grade sensor may provide a highly accurate relative signal, i.e. a change of the output value may stably and accurately correspond to a change of the grade angle. In one example, the grade sensor output value linearly changes with the grade angle so that, if the level angle and corresponding output value of the grade sensor is known, the grade angle of the grade indicating device can be accurately adjusted. However, not necessarily a linear interrelation between a change of the grade output value and the grade sensor exists, any other functional or mathematical relation may be present.

Accordingly, knowing the grade level sensor output value at the level angle defined by previous adjustment using the level sensor, the desired output value of the grade sensor corresponding to the desired grade angle can be computed based on the linear, functional or other mathematical interrelation between the change of the grade level sensor output values and the grade angle.

As this approach is feasible, but may lead to high computational effort, particularly in a dual grade mode where grade angle elements and corresponding output value element need to be handled. Therefore, a table may be generated beforehand and stored in a memory of the grade indicating device, the table holding a plurality of grade output values of the grade level sensor and corresponding grade angles of the laser beam or alternatively, a plurality of grade output value elements of the grade level sensor and corresponding grade angle elements of the laser beam.

In the following operations for defining a desired grade sensor output value will be described with regard to FIG. 5. In a first operation 501 a desired grade angle of the laser beam is obtained via user input. For example, an operator may input a desired grade angle or grade angle elements corresponding to an x- and y-axis of the laser beam or laser plane via an input unit of the grade indicating device. The input unit may include buttons and a corresponding display for individually setting the grade angle or grade angle value elements, e.g. after setting up the grade indicating device at the construction site with one of the x- and y-axis oriented based on the visual indication at the grade indicating device, as outlined above.

In operation 502 a grade output value of the grade sensor at the level angle is obtained, e.g. as outlined before, by adjusting the grade angle such that it coincides with the level angle as indicated by the level sensor and by reading the grade sensor output value or output value elements at the thus adjusted level angle.

Thereafter, in one alternative, in an operation 503 a grade output value difference is obtained based on a table of a plurality of grade output values of the grade level sensor and corresponding grade angles of the laser beam, the table, for example, being recorded beforehand during manufacture of the device. The grade sensor output value in the table corresponding to the grade sensor output value as at level angle, may in this process be defined as the zero angle or offset and any desired output value can be obtained by adding an output value difference based on the known functional relation between the grade output value difference and grade angle to the grade sensor output value at the level angle.

While the table used to store output value differences corresponding to grade angle differences based on the grade sensor output value at level angle, it is also possible that the table stores absolute values of the grade sensor output.

In an alternative to operation 503, in an operation 504, a grade output value difference may be obtained based on the functional relation between the grade output value differences of the grade level sensor and the grade angle differences of the laser beam. For example, a linear interrelation between the grade output value differences of the grade level sensor and the grade angle differences of the laser beam may be present, or any other functional or mathematical relation. Knowing the grade output value of the grade sensor at the level angle, any desired grade output value can thus be computed using the functional relation between the grade output value differences and the grade angle, with respect to the level angle.

After operations 503 and 504 in an operation 505 the desired grade output value is calculated by adding to the grade output value of the grade sensor at the level angle the grade output value difference corresponding to the desired grade angle. Then, the desired grade output value can be obtained by appropriately rotating the laser unit by the mechanical unit.

In the following, a further embodiment of the invention will be described with regard to FIGS. 6A, 6B and 6C.

Figure 6A:
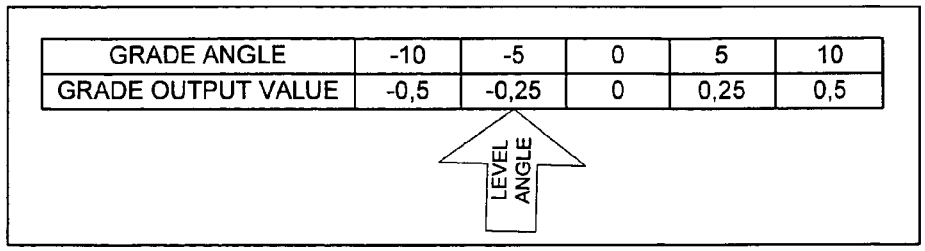
FIGS. 6A, 6B and 6C illustrate examples of tables of pairs of grade angle values and grade output values according to an embodiment of the invention, such as to adjust the grade level sensor to provide a desired output value.

FIG. 6A illustrates an example of a memory holding a table with corresponding pairs of grade angle values and grade output values of the grade angle sensor. This example table is particularly applicable to a grade indicating device with a laser beam having one degree of freedom, i.e. being adjustable only in one direction. In this case, for example, desired grade angle values minus 10 degrees, minus 5 degrees, 0, 5 and 10 degrees can be defined and during an initial recording procedure corresponding grade output values can be recorded for externally preset known grade angles. For example, the indicated pairs of grade angles and grade output values may be obtained.

As noted earlier, the relative accuracy of the grade output value may be high, while the absolute accuracy of, for example, a level angle indicated by the grade sensor may not be accurate. Accordingly, the zero or level angle indication by the grade sensor may not always correspond to the true level angle. Therefore the grade output value corresponding to a true level angle, such as determined by the level sensor, should from time to time be adjusted using the level sensor. Corresponding examples were given above.

In FIG. 6A it is now assumed that during regular operation the level sensor indicates a level angle at which the grade output value equals minus 0.25 (voltage or any other quantity). Accordingly, calculations for obtaining a desired grade output value on the basis of the table must start from the level angle or grade output value minus 0.25.

In an example, if a grade angle of minus 5 degrees would be desired (from minus 5 degrees to minus 10 degrees), the desired grade output value would minus 0.5. And for adjusting a grade angle of minus 5 degrees the mechanical unit would adjust the laser beam so that a grade output value of minus 0.5 is detected.

In another example, in FIG. 6A, a grade angle of plus 10 degrees should be adjusted, the desired grade output value would be 0.25, with the calculating starting at the level angle indicated in FIG. 6A, i.e. −0.25+0.5=0.25.

While the figure indicated only shows a limited number of grade angle values and corresponding grade output values, a larger table may be recorded.

Alternatively or in addition thereto, desired grade output value of a grade sensor may be obtained by an interpolation between two grade output values held in the table that correspond to two grade angles held in the table that are closest to the desired grade angle. The interpolation preferably is based on the known functional relation between the grade angle and the grade output value differences. In the example table of FIG. 6A, if a grade angle of 2.5 degrees would be desired, the neighbouring grade output values would be minus 0.25 and 0, and given a linear interrelationship between the grade angle and the grade output values, the desired grade output value would be minus 0.125.

Figure 6B:
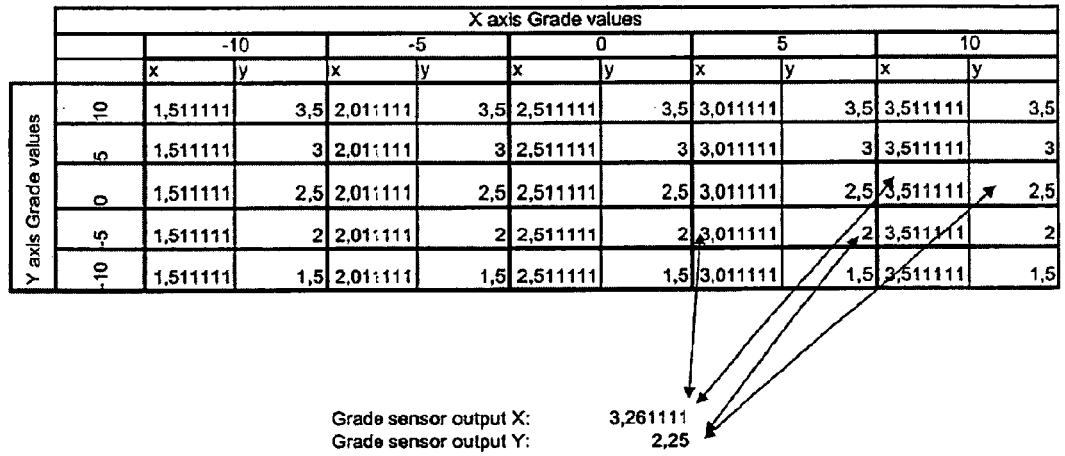

FIG. 6B illustrates an example table particularly applicable for a dual grade application with a laser beam rotating on a laser plane, the table illustrating the x-axis grade values and the y-axis grade values and corresponding grade output values x and y.

In the memory now the table is held with a plurality of grade output values corresponding to externally preset known grade angle elements corresponding to the x-axis and corresponding to the y-axis corresponding to the sensing directions of the grade sensor. In the present case, as can be seen from the values x and y in the respective directions being equal to one another for a particular angle, the grade sensor sensing directions, i.e. the x- and y-axis are, are aligned with an externally set recording x- and y-axis used for recording the values in the table, so that the x output of the grade sensor corresponds to the x-axis and the y output of the grade sensor corresponds to the y-axis. This, however, not necessarily is the case, if a deviation between the grade sensor sensing directions and the recording x- and y-axis exist, e.g. do to a misalignment during recording the table, equality of the values x and y corresponding to the x and y angles would not be present. However, in the two-dimensional table, any such deviation is accounted for and 'automatically' corrected.

FIG. 6B shows absolute output values of the grade sensor for the x-axis and the y-axis, calculated on the basis of a grade output value at a level angle as detected by the level sensor with a level angle x-axis element and a level angle y-axis element. In FIG. 6B, the grade output value at the level angle x-axis element is 2.511111 and the grade output value at the level angle y-axis element is 2.5. Knowing these output values, the table is correspondingly adjusted so that desired output values of the grade sensor in x- and y-direction can be directly read from the table based on the desired grade angle elements.

For example, for desired grade angle having the x-axis grade angle value 5 and the y-axis grade angle value minus 5, the desired grade sensor output value x element would be 3.011111 and the corresponding desired grade sensor output value y-axis element would be 2.

Similar to what was said with regard to FIG. 6A, if a desired grade angle is not pre-recorded in the table, an interpolation may be used using the two neighbouring grade angle values and corresponding grade sensor values. In the example of FIG. 6B, a grade angle y-axis element of minus 2.5 degrees and a an x-axis grade angle element of 7.5 degrees and given a linear interrelation between the grade sensor value changes and the grade angle, would lead to a grade sensor output value in x-direction 3.261111 and a desired grade sensor output in y-direction of 2.25, based on the value pairs obtained from the neighbouring grade angles in x-direction 5 and 10 and in y-direction 0 and −5.

Figure 6C:
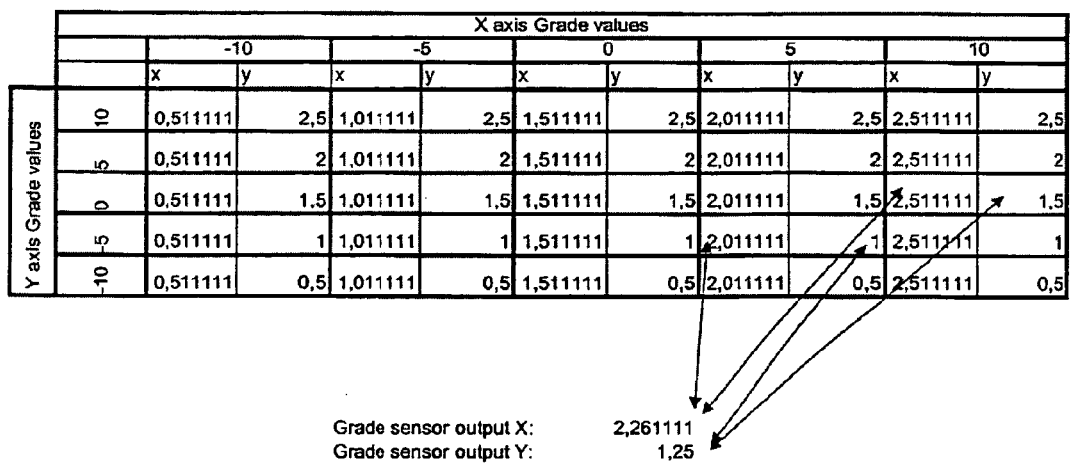

FIG. 6C shows a similar example as FIG. 6B, however, with an assumed grade output value at the level angle in x-axis direction of 1.511111 and a grade output value at the level angle in y-axis direction of 1.5, the level angle being detected thus at a different output value of the grade sensor.

Again, the table in FIG. 6C is calculated on the basis of the grade output value elements at the level angle, so that a desired grade output value element can be directly taken from the table based on the desired grade angle element. Also in this case, if a desired grade angle is not readily available from the table, an interpolation may be used in order to obtain the desired grade sensor output values in x and y direction. Again, in FIG. 6C it is assumed that the grade angle elements should be in x direction 7.5 degrees and in y direction −2.5 degrees. In this example, the desired grade sensor output in x direction would be 2.261111 and the desired grade sensor output in y direction would be 1.25.

In an alternative to degrees also other grade angle units can be employed such as percent.

In the following a further embodiment will be described with regard to FIG. 7.

Figure 7:
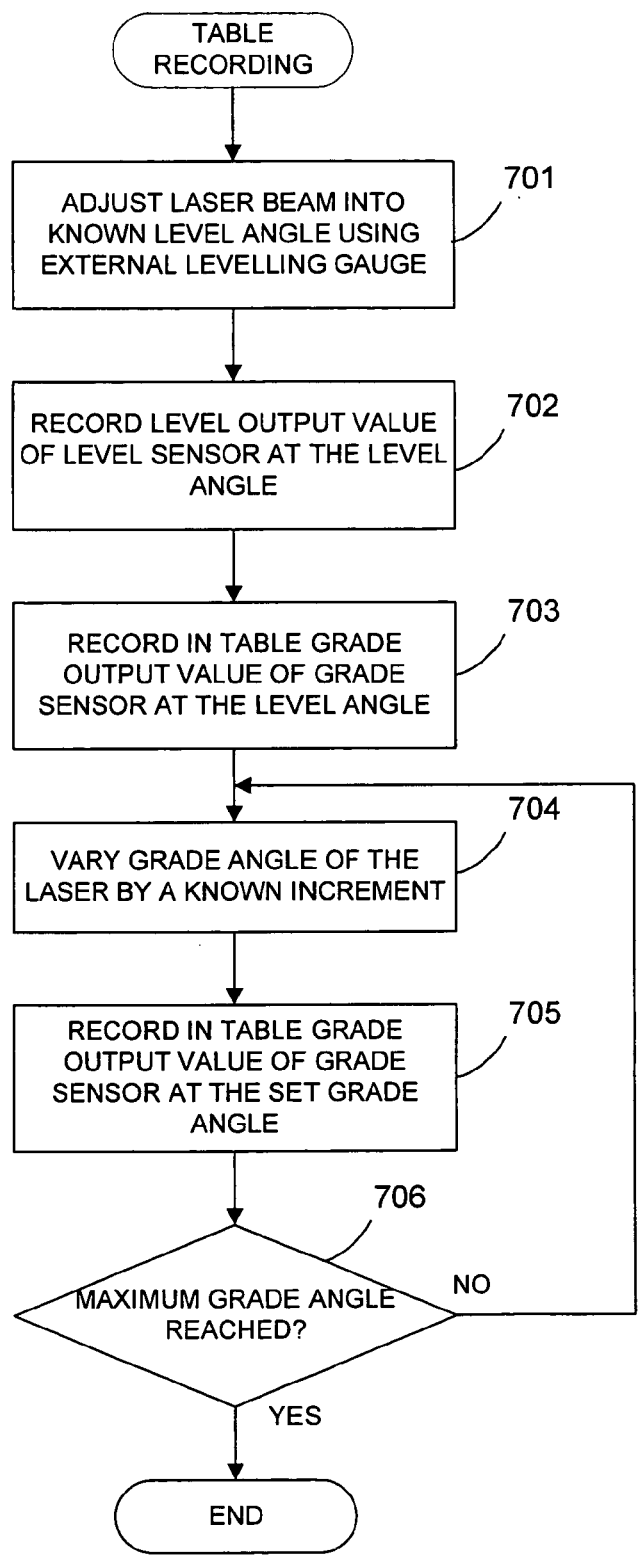
FIG. 7 illustrates operations of a method for indicating a grade according to another embodiment of the invention, particularly illustrating operations for recording a table of pairs of grade angles and grade output values.

FIG. 7 particularly illustrates operations for recording a table of grade sensor output values and corresponding grade angles.

The operations of FIG. 7 may be performed upon device manufacture, wherein the grade indicating device is sequentially adjusted into known directions in order to have a known orientation of the laser plane.

In a first operation 701, the laser beam or laser plane is adjusted into a known level angle using an external levelling gage. For example, using manufacturing equipment, the laser plane is adjusted in a perfectly level orientation and in an operation 702 level output values or level output value elements of the level sensor at the level angle are recorded. Moreover, the grade indicating device is arranged on a workbench such that the sensing directions of the grade sensor are preferably aligned with tilting directions, i.e. recording x- and y-axis, of the workbench. However, as noted above, some misalignment is accounted for during recording the table and within certain limits does not have a significant negative influence.

Then, in operation 703, in the table grade output values of the grade sensor at the level angle are recorded and in a loop, consisting of operation 704, 705, 706, the grade angle is then incremented and the corresponding grade output values of the grade sensor at the set grade angle are recorded so that gradually the table is filled. If the decision is "No", operations 704-706 are repeated, otherwise the operation ends.

More precisely, in operation 704, the grade angle is modified by a known increment and in operation 705 the table grade output value of the grade sensor at the set grade angle is recorded. More precisely, to record the two dimensional table, such as shown in FIG. 6B, one of the grade angle elements associated with one of the recording x- and y-axis set and the other is modified by known increments until the maximum grade angle element in this direction is reached. Then the one of the grade angle elements is incremented and the other is again modified by known increments until the maximum grade angle element in this direction is reached. This process is repeated until all entries of the table are filled, i.e. until both grade angle elements have been varied within their given ranges.

Proceeding as outlined above for obtaining a two-dimensional table for a dual grade indicating device allows some deviation between the grade sensor sensing directions, i.e. the x- and y axis outlined before and the recording and y-axis. Ideally, the sensing directions and the x and y-axis coincide, however, if a deviation exists, this is accommodated for during the recording process and a loss of accuracy is minimal, as noted before.

In one example during manufacturing the grade indicating device is mounted on a reference base that can be tilted along an x-axis and a y-axis. During the mounting process of the grade indicating device on the base the device is preferably mounted such that the sensing directions of the grade sensor are aligned with the recording x- and y-axis of the base. For example, such alignment could be achieved by using the visual indication on the housing of the grade indicating device, indicating one of the sensing directions of the grade indicating device.

In the following a further embodiment of the invention will be described with regard to FIG. 8.

Figure 8:
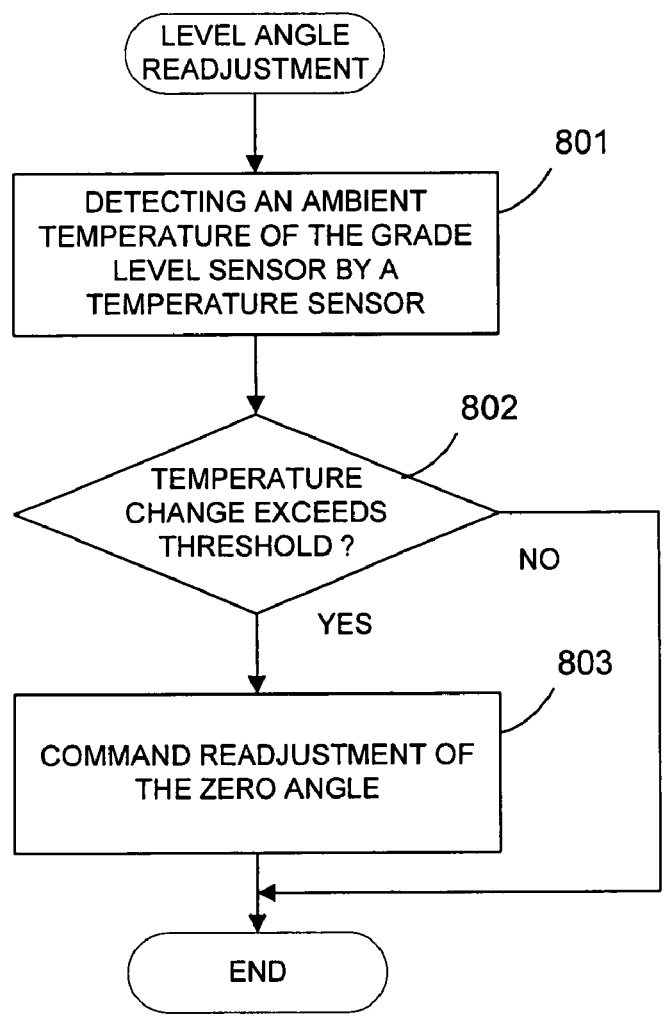
FIG. 8 illustrates operations of a method for indicating a grade according to another embodiment of the invention, particularly illustrating readjusting upon a temperature change.

FIG. 8 illustrates operations particularly outlining a level angle readjustment during operation of the grade indicating device upon a temperature change.

As noted above, the grade sensor generally provides an output signal wherein the changes of the output signal is stable over time and stably over time correlates with grade angle changes. However, a temperature change may have an influence on the functional relationship between the change of the output signal of the grade sensor and the grade angles. Moreover, the mechanical components of the grade sensing device may be influenced by larger temperature changes and, as noted above, due to the large distances potentially covered by the grade sensing device small deviations may translate into non-neclectable errors in a larger distance to the grade indicating device.

Monitoring temperature changes therefore is particularly important in environments with potentially large temperature changes, such as on a construction site over a work day, were the grade sensing device may be subjected to temperature changes of 40 degrees Celsius and more.

Therefore, for performing a level angle readjustment based on temperature changes in an operation 801 an ambient temperature of the grade level sensor is detected by a temperature sensor. The ambient temperature may be the air temperature in the vicinity of the grade indicating device or within the housing of the grade indicating device.

In an operation 802 it is determined whether a temperature change exceeds a predefined threshold. For example, a temperature change of 5 degrees Celsius could be defined as the threshold. However, it is noted that larger or smaller thresholds could be devised. The size of the threshold generally is a trade-off between a desired accuracy of the grade indicating device over time and user friendliness, as a readjustment of the level angle requires a brief interruption of the regular operation of the grade indicating device.

If in operation 802 the decision is "YES", indicating that the temperature change exceeded the predetermined threshold, a readjustment of the zero angle is commanded in an operation 803, such as by the central processing unit 150 or 350. Readjustment of the zero angle substantially follows the operations of FIG. 4. That is, the grade indicating device is switched into a readjustment mode, in which the laser beam or laser plane is readjusted to level angle using the level sensor as outlined before. Once in level position or the zero angle reached, the output value of the grade sensor is obtained in this position as a new reference point for the subsequent determination of grade angles.

Then, the laser beam or laser plane may be driven back into the orientation held before switching to the readjustment mode i.e., a desired grade output value of the grade sensor is obtained based on the previous desired grade angle of the laser unit and the grade output value measure at the level angle. The grade angle of the laser beam is thereby adjusted by the mechanical unit so that the grade sensor provides the desired grade output value. Thereafter, the readjustment mode is switched back to the normal operation mode.

Figure 9:
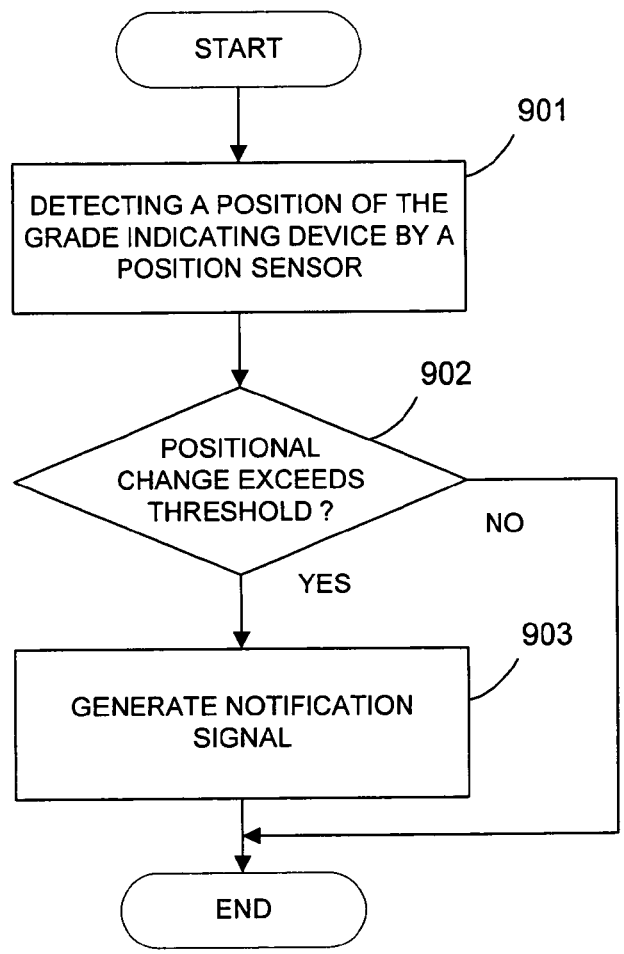
FIG. 9 illustrates operations of a method for indicating a grade according to another embodiment of the invention, particularly operations to detect a positional change exceeding a threshold.

In the following a further embodiment of the invention will be described with regard to FIG. 9, FIG. 9 showing operations for a readjustment of the level angle upon detecting a positional change.

Similar to the embodiment of FIG. 8, not only temperature changes take an influence on the accuracy of the device, but also positional changes, e.g. unstable surface soil holding the grade indicating device. Even though the grade sensor can be employed to hold a certain desired grade angle over some positional movement, such as by readjusting the laser plane via the mechanical unit, if a positional change exceeds a certain limit, i.e., if for example the grade indicating device is tilted due to unstable ground, mechanical limits may be reached and an incorrect grade may be indicated or accuracy of the grade angle may be lost.

Therefore, if a positional change exceeds a certain threshold, an alarm is triggered, advising the operator of the device.

In an operation 901, a position of the grade indicating device is detected by a positional sensor. For example a position sensor could be a position sensing element using GPS or any other technique. Moreover, in another example the positional sensor includes a unit to supervise a readjustment of the laser plane or laser beam during operation as noted above, to compensate for small positional changes.

Such unit could for example count pulses of stepper motors of the mechanical unit adjusting the orientation of the laser unit and thus acquiring a measure describing a positional change during operation of the device.

In an operation 902 it is then determined whether the positional change exceeds a certain threshold. The threshold can be set as desired, being a trade-off between accurate grade indication and user friendliness.

In one example the pulses of the stepper motor are counted after initial setup and grade angle adjustment, and if the number of the pulses of the stepper motors exceeds a certain threshold, an alarm is emitted.

It is noted that a certain readjustment of the laser beam or laser plane during normal operation is to be expected, e.g. due to wind or other environmental factors slight readjustments of the mechanical unit may be required in order to hold a certain output value of the grade sensor.

If, however, the number of impulses of the stepper motors into respectively the same direction exceeds the predefined threshold, it is known that an intolerable positional change occurred.

Similarly, if a position detecting unit such as a GPS sensor or similar detects a positional change exceeding a certain predetermined threshold, it is known that an intolerable positional change occurred.

If in operation 902 the decision is "YES", indicating that the positional change exceeds the threshold, an alarm is triggered. The alarm could be one or more of a visual indication on the device, an audio indication, a transmission of a message to an operator such as via a wireless link, or the device could be turned off.

In the following a further embodiment of the invention is described with regard to FIG. 10.

Figure 10:
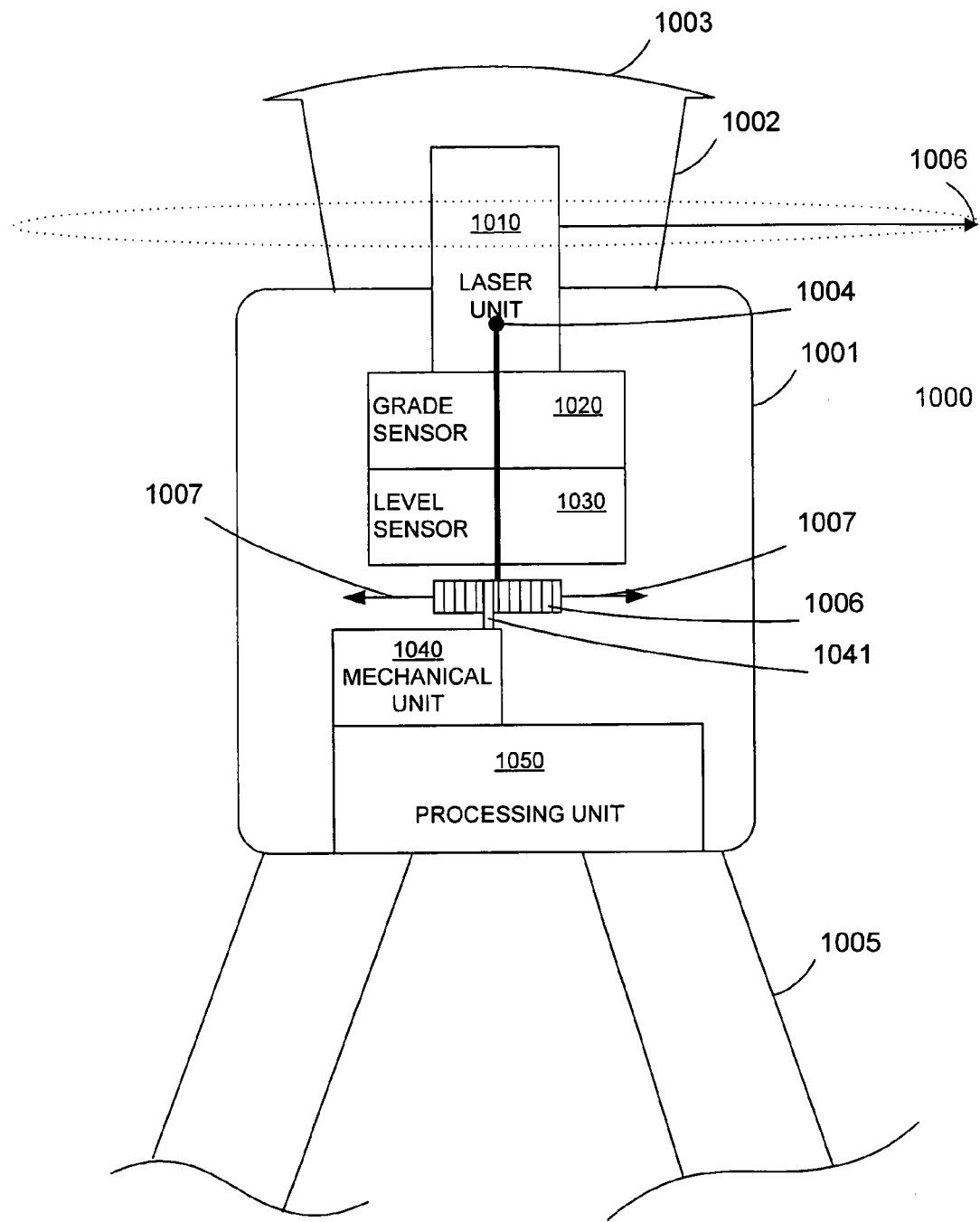
FIG. 10 illustrates elements of a grade indicating device according to another embodiment of the invention.

FIG. 10 illustrates elements of a grade indicating device according to another embodiment of the invention.

FIG. 10 generally indicates at 1000 a grade indicating device. The grade indicating device comprises a housing 1001 holding, similar to FIGS. 1 and 3, a laser unit 1010, a grade sensor 1020, a level sensor 1030, a mechanical unit 1040 and a processing unit 1050. The laser unit is integrally formed or connected to the grade sensor and the level sensor and pivotably mounted in the housing, turnable around a pivoting point 1004 by operation of the mechanical unit 1040.

In the example of FIG. 10 the mechanical unit 1040 comprises a driving unit 1041 such as a shaft engaging with a spindle 1006 affixed to the laser unit 1010, the grade sensor and the level sensor. Accordingly, upon rotation of the shaft 1041 the spindle 1006 is moved as indicated by the arrows 1007, depending on a direction of rotation of the shaft 1041, leading to a rotation of the laser unit, the grade sensor and the level sensor around the pivoting point 1004, and consequently to a tilting of the laser beam or laser plane 1060.

For mechanically protecting the laser unit and other elements of the grade indicating device for use in surveying and construction applications under a variety of field conditions, the housing is provided with a preferably waterproof upper transparent lighthouse assembly 1002, 1003 within which the laser unit may rotate and through which the laser beam is projected. For example, the lighthouse assembly includes for upstanding flat transparent panes of glass of high optical quality and which are joined together at their side edge surfaces so as to form a squaring cross section, the glass panes denoted 1002. The lower edges of the panes may be mounted within recessed seats formed in an upper ring of the housing 1001. The upper edges of the panes may be mounted within recessed seats formed within a top casing 1003 of the lighthouse assembly. The lighthouse assembly is dimensioned such that the laser beam or laser plane may be emitted with a certain maximum grade angle to meet specification requirements.

Stands 1005, such as of a tripod are used to securely hold a housing 1001, as known in the art.

While in the above individual embodiments are described with reference to the figures, it is explicitly noted that any combinations of the embodiments or elements thereof are possible and comprised by the above specification.

Moreover, a program including instructions adapted to cause data processing means such as the central processing unit may be provided, to carry out the operations of the above embodiments.

A computer readably medium may be devised in which the program is embodied. A computer program product comprising the computer readable medium may be provided.

The grade indicating device of the above embodiments may be integrated into an optical instrument.

The invention claimed is:

1. A grade indicating device, comprising:
a laser unit to emit a laser beam;
a level sensor affixed to the laser unit to indicate a level angle of the laser beam;
a grade sensor affixed to the laser unit to provide a grade output value corresponding to a grade angle of the laser beam relative to the level angle, wherein the grade sensor and the level sensor are in fixed relation to the laser beam emitted from the laser unit;
a controller adapted to obtain the grade output value of the grade sensor at the level angle; and
a mechanical unit to adjust the grade angle of the laser beam so that the grade sensor provides a desired grade output value that deviates from the obtained output value of the grade sensor at the level angle by a difference corresponding to a desired grade angle of the laser beam relative to the level angle.

2. The grade indicating device of claim 1, wherein the controller is adapted to:
issue a command instructing the mechanical unit to adjust the grade angle of the laser unit so that the level sensor provides a predetermined level output value corresponding to the level angle of the laser beam; and
obtain the desired grade output value of the grade sensor based on the desired grade angle of the laser unit and the grade output value of the grade sensor at the level angle.

3. The grade indicating device of claim 1, wherein
at least a portion of the laser unit is rotatable to emit the laser beam in a laser plane;
the grade output value consists of two grade output value elements;
the grade angle consists of two grade angle elements;
each grade output value element corresponds to one grade angle element associated with one of a X-axis and a Y-axis perpendicular to one another and defining the laser plane; and
the grade indicating device includes a visual indication aligned with at least one of the axes.

4. The grade indicating device of claim 1, wherein the controller is adapted to obtain the desired grade output value by accessing a memory holding a table of a plurality of grade output values of the grade sensor and corresponding grade angles of the laser beam.

5. The grade indicating device of claim 1, wherein the controller is adapted to obtain the desired grade output value based on a correlation function describing a functional relation between grade output value differences of the grade sensor and grade angle differences of the laser beam.

6. The grade indicating device of claim 4, wherein the controller is adapted to obtain the desired grade output value of the grade sensor by an interpolation between two grade output values held in the table that correspond to two grade angles held in the table that are closest to the desired grade angle.

7. The grade indicating device of claim 2, including a temperature sensor to detect an ambient temperature of the grade indicating device and to emit an instruction commanding a calibration of the zero angle, if a temperature change exceeds a predetermined threshold.

8. The grade indicating device of claim 2, including a position sensor to detect a position of the grade indicating device and to emit an alarm, if a positional change exceeds a predetermined threshold.

9. The grade indicating device of claim 1, wherein a level sensor output value under the condition that the laser plane is level is defined as the level output value defining the zero angle.

10. The grade indicating device of claim 2, wherein for calibrating the zero angle during operation, the controller is adapted:
to emit an instruction to the mechanical unit to adjust the grade angle of the laser unit so that the level sensor provides the level output value defining the zero angle and, thereafter,
to emit an instruction commanding the mechanical unit to adjust the grade angle of the laser unit again into the position in which the grade sensor provides the desired grade output value.

11. The grade indicating device of claim 4, wherein the controller is adapted to record in a memory holding the table a plurality of grade output values corresponding to externally set known grade angles.

12. The grade indicating device of claim 4, wherein the controller is adapted to record in a memory holding the table a plurality of grade output values corresponding to externally set known grade angles elements corresponding to a X-axis and corresponding to a Y-axis, the X-axis and the Y-axis spanning a reference plane.

13. The grade indicating device of claim 1, wherein the grade sensor includes a gravity sensor.

14. The grade indicating device of claim 1, wherein the level sensor includes a detector of a position of a bubble in a fluid.

15. A method for indicating a grade, comprising the steps of:
emitting a laser beam from a laser unit;
indicating a level angle of the laser beam by a level sensor affixed to the laser unit;
providing a grade output value by a grade sensor affixed to the laser unit, the grade output value corresponding to a grade angle of the laser beam relative to the level angle, wherein the grade sensor and the level sensor are in fixed relation to the laser beam emitted from the laser unit;
obtaining the grade output value of the grade sensor at the level angle; and
adjusting the grade angle of the laser beam by a mechanical unit so that the grade sensor provides a desired grade output value that deviates from the obtained output value of the grade sensor at the level angle by a difference corresponding to a desired grade angle of the laser beam relative to the level angle.

16. The method for indicating a grade of claim 15, further comprising the steps of:
issuing a command instructing the mechanical unit to adjust the grade angle of the laser unit so that the level sensor provides a predetermined level output value corresponding to the level angle of the laser beam; and
obtaining the desired grade output value of the grade sensor based on a desired grade angle of the laser unit and the grade output value of the grade sensor at the level angle.

17. The method for indicating a grade of claim 15, further comprising the steps of:
rotating at least a portion of the laser unit to emit the laser beam in a laser plane;
providing the grade output value with two output value elements;
providing the grade angle with two grade angle elements;
wherein each grade output value element corresponds to one grade angle element associated with one of a X-axis and a Y-axis perpendicular to one another and defining the laser plane; and
providing on the grade indicating device visual indication aligned with at least one of the axes.

18. The method for indicating a grade of claim 15 including the step of obtaining the desired grade output value by accessing a memory holding a table of a plurality of grade output values of the grade sensor and corresponding grade angles of the laser beam.

19. The method for indicating a grade of claim 15, including the step of obtaining the desired grade output value based on a correlation function describing a functional relation between grade output value differences of the grade sensor and grade angle differences of the laser beam.

20. The method for indicating a grade of claim 18, further including the step of obtaining the desired grade output value of the grade sensor by an interpolation between two grade output values held in the table that correspond to two grade angles held in the table that are closest to the desired grade angle.

21. The method for indicating a grade of claim 16, further including the step of detecting an ambient temperature of the grade indicating device by a temperature sensor and emitting an instruction commanding a calibration of the zero angle, if a temperature change exceeds a predetermined threshold.

22. The method for indicating a grade of claim 16, further including the step of detecting a position of the grade indicating device by a position sensor and emitting an alarm, if a positional change exceeds a predetermined threshold.

23. The method for indicating a grade of claim 15, further including the step of defining a level sensor output value under the condition that the laser plane is level as the level output value defining the zero angle.

24. The method for indicating a grade of claim 16, wherein the step of calibrating the zero angle during operation includes the steps of:
emitting an instruction to the mechanical unit to adjust the grade angle of the laser unit so that the level sensor provides the level output value defining the zero angle, and thereafter
emitting an instruction commanding the mechanical unit to adjust the grade angle of the laser unit again into the position in which the grade sensor provides the desired grade output value.

25. The method for indicating a grade of claim 18, further including the step of recording in a memory holding the table a plurality of grade output values corresponding to externally set known grade angles.

26. Method for indicating a grade of claim 18, including recording in a memory holding the table a plurality of grade output values corresponding to externally set known grade angles elements corresponding to a X-axis and corresponding to a Y-axis, the X-axis and the Y-axis spanning a reference plane.

27. The method for indicating a grade of claim 15, wherein the grade sensor includes a gravity sensor.

28. The method for indicating a grade of claim 15, wherein the level sensor includes a detector of a position of a bubble in a fluid.

29. A computer readable medium, in which a program is embodied, where the program is to make a computer execute the method of claim 15.

* * * * *